P. J. FILBIN.
PLANTER.
APPLICATION FILED APR. 17, 1911.

1,035,432.

Patented Aug. 13, 1912.

Witnesses
W. C. Fielding
Francis Boyle

Inventor
Patrick J. Filbin.
By Chandler & Chandler
Attorney

UNITED STATES PATENT OFFICE.

PATRICK J. FILBIN, OF STEELE, NORTH DAKOTA.

PLANTER.

1,035,432.  Specification of Letters Patent.  Patented Aug. 13, 1912.

Application filed April 17, 1911. Serial No. 621,620.

*To all whom it may concern:*

Be it known that I, PATRICK J. FILBIN, a citizen of the United States, residing at Steele, in the county of Kidder, State of North Dakota, have invented certain new and useful Improvements in Planters; and I do hereby declare the following to be a full, clear, and exact description of the invention, such as will enable others skilled in the art to which it appertains to make and use the same.

This invention relates to planters.

In planters of ordinary construction a furrow is made and in this furrow the seed is dropped, the seed thus dropping into soft earth. It has been found from experiment that better results have been obtained when dropping seed on a packed surface.

Therefore the primary object of this invention is to provide a novel means for packing the earth in a furrow previous to the dropping of seed.

The present invention contemplates equipping the seed delivery tube with a wheel disposed in advance of the delivery end of said tube, this wheel together with the delivery end of the tube being designed for simultaneous entry into soft earth, the wheel making a furrow and simultaneously packing the ground in the furrow for the reception of the seed.

It is well known that soil accumulates on the tread of guide wheels and the like on planters and to prevent an occurrence of this kind, a further object of the present invention is to dispose the tread of the soil packing wheel in intimate contact with the delivery end of the seed delivery tube so that the latter will act as a scraper in constantly maintaining the tread of the wheel free from accumulations.

With the above objects in view the invention consists in certain novel details of construction and combination of parts hereinafter fully described and claimed, it being understood that various modifications may be made in the minor details of construction within the scope of the appended claim.

Figure 1:
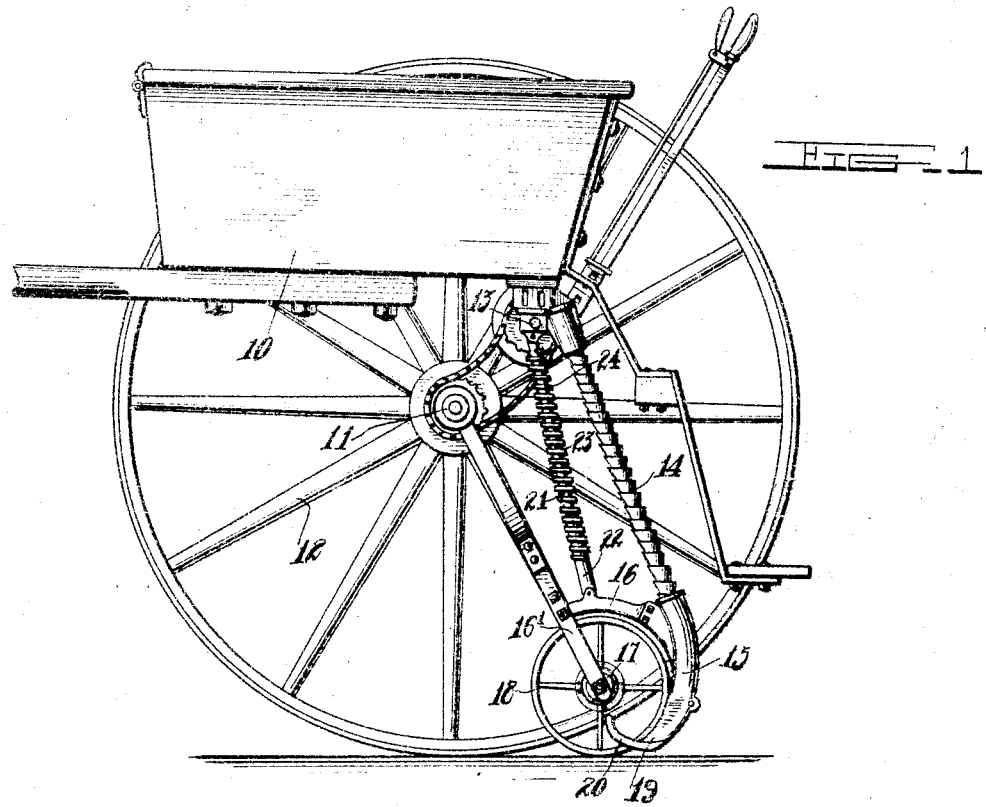
Figure 2:
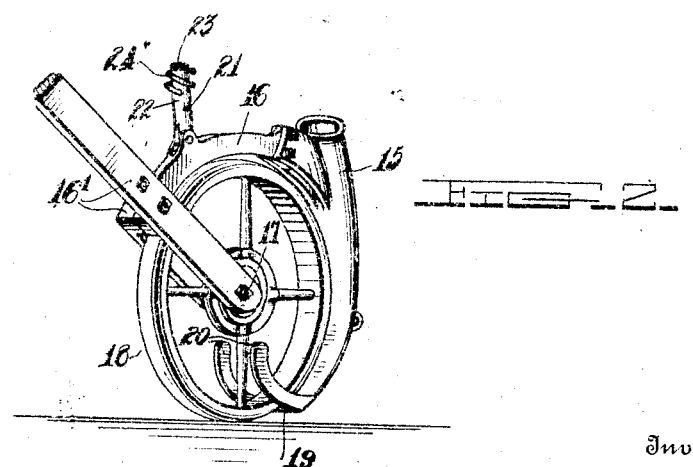

In the accompanying drawing forming part of this specification: Figure 1 is a side elevation of a planter with one of the ground wheels removed to expose the ground packer and delivery tube embodying my improvements. Fig. 2 is a detail perspective view of the delivery tube and ground wheel.

Referring now to the drawing in which like characters of reference designate similar parts, a conventional planter is shown comprising a seed receptacle 10, secured to an axle 11 which is equipped at its outer ends with ground wheels 12. A driven shaft 13 is supported upon the seed receptacle bottom and controls the seed dropping valves in seed delivery tubes 14. This planter is of the ordinary construction and forms no part of the present invention.

The seed delivery tube 14 is provided with a spout 15 the upper end of which is equipped with a forwardly projecting curbed bracket arm 16, and to the forward end of this arm are fixed rearwardly inclining arms 16', which are equipped with suitable bearings to receive the axle 17 of a wheel 18. The tread of this wheel is rounded and disposed in intimate contact with the discharge end 19 of the delivery tube spout so that the latter acts as a scraper in freeing the tread of the wheel from accumulations of soil. A pair of scraper arms 20 are formed integral with the delivery end of the spout and engage the sides of the wheel tread, these scraper arms maintaining the sides of the wheel tread free from accumulations.

For effecting the simultaneous entry of the wheel tread and discharge end of the spout into soft earth, the upper end of the arm 16' is pivotally secured to the axle. A telescoping post 21 is connected at one end to the bracket arm 16 and at its opposite end is preferably pivotally secured to the shaft 13, this post being formed of a sleeve 22 which is pivotally secured to the bracket arm and a stem 23 telescoping into this sleeve the stem being secured to the shaft as above stated, a helical spring 24 being seated on the sleeve and stem and rigidly connected at its opposite ends to the sleeve and stem respectively, this spring normally holding the telescoping post in extended position so that the packing wheel will penetrate into the soft earth, the spring permitting of the post telescoping to permit of the wheel rising and riding over obstructions such as stones, stumps and the like in the soil.

It will be noted that the tread of the soil packing wheel projects considerably below and in advance of the delivery end of the delivery tube spout, this construction enabling the wheel tread to simultaneously make and pack a furrow in the soil in advance of the discharge of seed from the delivery end of the spout.

What is claimed, is:—

A planter attachment including a link, a curved delivery tube, an arched bracket terminally connected to said tube and to said link, and having an extension extending along said link, a ground wheel journaled in said extension and said link and having a ground packing thread conforming to the contour of said bracket and said tube and projecting slightly below and in advance of the delivery end of said tube, and upstanding scrapers carried by said tube bearing against the edges of said wheel.

In testimony whereof, I affix my signature, in presence of two witnesses.

PATRICK J. FILBIN.

Witnesses.
F. D. JONES,
L. DORNACHER.